United States Patent
Muroya et al.

(10) Patent No.: US 12,199,311 B2
(45) Date of Patent: Jan. 14, 2025

(54) BATTERY AND METHOD OF MANUFACTURING SAME

(71) Applicant: PRIME PLANET ENERGY & SOLUTIONS, INC., Tokyo (JP)

(72) Inventors: Yohei Muroya, Kakogawa (JP); Kohji Umemura, Ono (JP); Toshiki Imabori, Kasai (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 209 days.

(21) Appl. No.: 17/502,190

(22) Filed: Oct. 15, 2021

(65) Prior Publication Data

US 2022/0158311 A1 May 19, 2022

(30) Foreign Application Priority Data

Nov. 16, 2020 (JP) ................. 2020-190260

(51) Int. Cl.
| | |
|---|---|
| *H01M 50/533* | (2021.01) |
| *H01M 50/103* | (2021.01) |
| *H01M 50/176* | (2021.01) |
| *H01M 50/528* | (2021.01) |
| *H01M 50/553* | (2021.01) |
| *H01M 50/564* | (2021.01) |

(52) U.S. Cl.
CPC ....... *H01M 50/533* (2021.01); *H01M 50/103* (2021.01); *H01M 50/176* (2021.01); *H01M 50/528* (2021.01); *H01M 50/553* (2021.01); *H01M 50/564* (2021.01)

(58) Field of Classification Search
CPC ............ H01M 50/533; H01M 50/103; H01M 50/176; H01M 50/528; H01M 50/553; H01M 50/564; H01M 50/172; H01M 50/552; H01M 50/567; H01M 50/55; H01M 10/04; H01M 50/536; H01M 50/566; H01M 50/15; Y02E 60/10; Y02P 70/50
See application file for complete search history.

(56) References Cited

U.S. PATENT DOCUMENTS

| | | | |
|---|---|---|---|
| 2011/0076552 A1 | 3/2011 | Taniguchi et al. | |
| 2014/0242440 A1* | 8/2014 | Yamada | H01M 50/176 429/121 |
| 2016/0181577 A1* | 6/2016 | Kajiwara | H01M 50/562 429/179 |

(Continued)

FOREIGN PATENT DOCUMENTS

| | | |
|---|---|---|
| CN | 102034951 A | 4/2011 |
| CN | 105849939 A | 8/2016 |

(Continued)

*Primary Examiner* — Ula C Ruddock
*Assistant Examiner* — Sarika Gupta
(74) *Attorney, Agent, or Firm* — Finnegan, Henderson, Farabow, Garrett and Dunner, LLP

(57) ABSTRACT

A battery includes: a conductive member provided with a through hole; and a terminal member inserted in the through hole and having a tip portion exposed on the conductive member. A joined portion of the tip portion of the terminal member to the conductive member is formed. The joined portion includes a thick portion at which a thickness of the terminal member is relatively thick, and a thin portion at which the thickness of the terminal member is relatively thin.

13 Claims, 11 Drawing Sheets

(56) References Cited

U.S. PATENT DOCUMENTS

2016/0372722 A1  12/2016  Yoshida et al.
2017/0237049 A1  8/2017  Yoneda

FOREIGN PATENT DOCUMENTS

| CN | 106257711 A | 12/2016 |
| EP | 3 038 189 A1 | 6/2016 |
| JP | 2011-76867 A | 4/2011 |
| JP | 2014-072190 A | 4/2014 |
| JP | 2014-165155 A | 9/2014 |
| JP | 2017-041320 A | 2/2017 |
| JP | 2017-147080 A | 8/2017 |
| JP | 2019-067762 A | 4/2019 |
| KR | 10-2011-0035868 A | 4/2011 |
| WO | WO 2015/025388 A1 | 2/2015 |

\* cited by examiner

BATTERY AND METHOD OF MANUFACTURING SAME

This nonprovisional application is based on Japanese Patent Application No. 2020-190260 filed on Nov. 16, 2020, with the Japan Patent Office, the entire contents of which are hereby incorporated by reference.

BACKGROUND OF THE INVENTION

Field of the Invention

The present disclosure relates to a battery and a method of manufacturing the battery.

Description of the Background Art

Conventionally, in a battery, a terminal member and a current collector have been joined to each other by swaging. Such a structure is disclosed, for example, in Japanese Patent Laying-Open No. 2011-076867 (PTL 1).

In PTL 1, a secondary battery having a low resistance can be provided by using both fixation by swaging and laser welding in fixation between a current collector and a terminal member.

However, when the thickness of the swaged portion is insufficient, joining strength of the terminal member may be decreased, disadvantageously. On the other hand, provision of an excessively increased thickness to an unnecessary portion in the joined portion unfavorably leads to over-engineering.

SUMMARY OF THE INVENTION

An object of the present disclosure is to provide: a battery in which joining strength of a terminal member can be improved while avoiding over-engineering; and a method of manufacturing such a battery.

A battery according to the present disclosure includes: a conductive member provided with a through hole; and a terminal member inserted in the through hole and having a tip portion exposed on the conductive member. A joined portion of the tip portion of the terminal member to the conductive member is formed. The joined portion includes a thick portion at which a thickness of the terminal member is relatively thick, and a thin portion at which the thickness of the terminal member is relatively thin.

A method of manufacturing a battery according to the present disclosure includes: inserting a terminal member into a through hole of a conductive member; forming a joined portion that has a central axis extending in a short side direction of an upper surface of the battery, the joined portion being a portion at which a tip portion of the terminal member is joined to the conductive member; and processing the joined portion to form a thick portion on the central axis, the thick portion being a portion at which a thickness of the joined portion is relatively thick.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
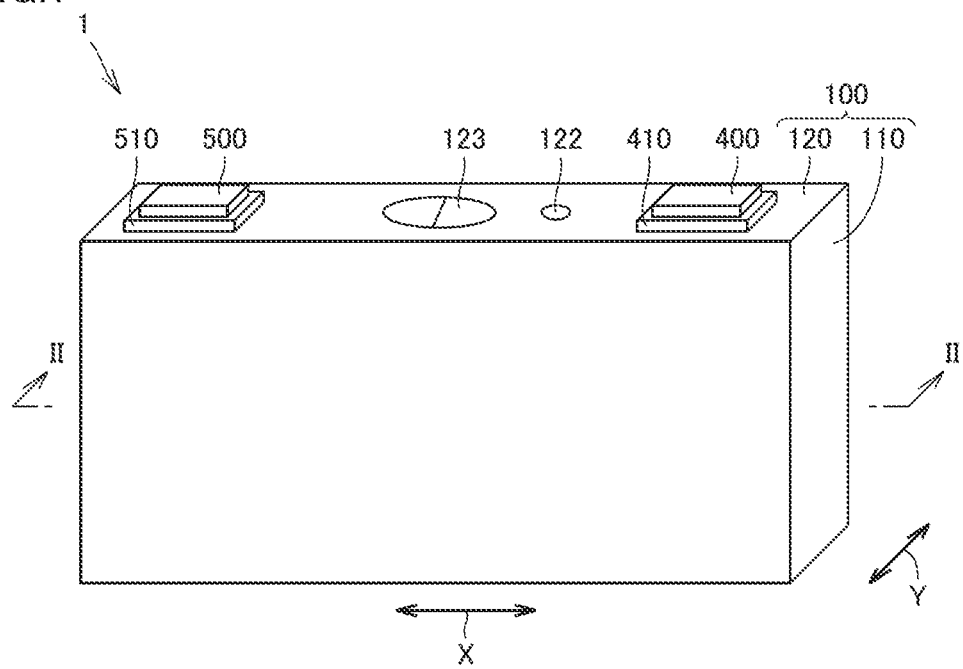
FIG. 1 is a perspective view of a prismatic secondary battery.

Hereinafter, embodiments of the present disclosure will be described. It should be noted that the same or corresponding portions are denoted by the same reference characters, and may not be described repeatedly.

It should be noted that in the embodiments described below, when reference is made to number, amount, and the like, the scope of the present disclosure is not necessarily limited to the number, amount, and the like unless otherwise stated particularly. Further, in the embodiments described below, each component is not necessarily essential to the present disclosure unless otherwise stated particularly.

(Configuration of Prismatic Secondary Battery 1)

Figure 2:
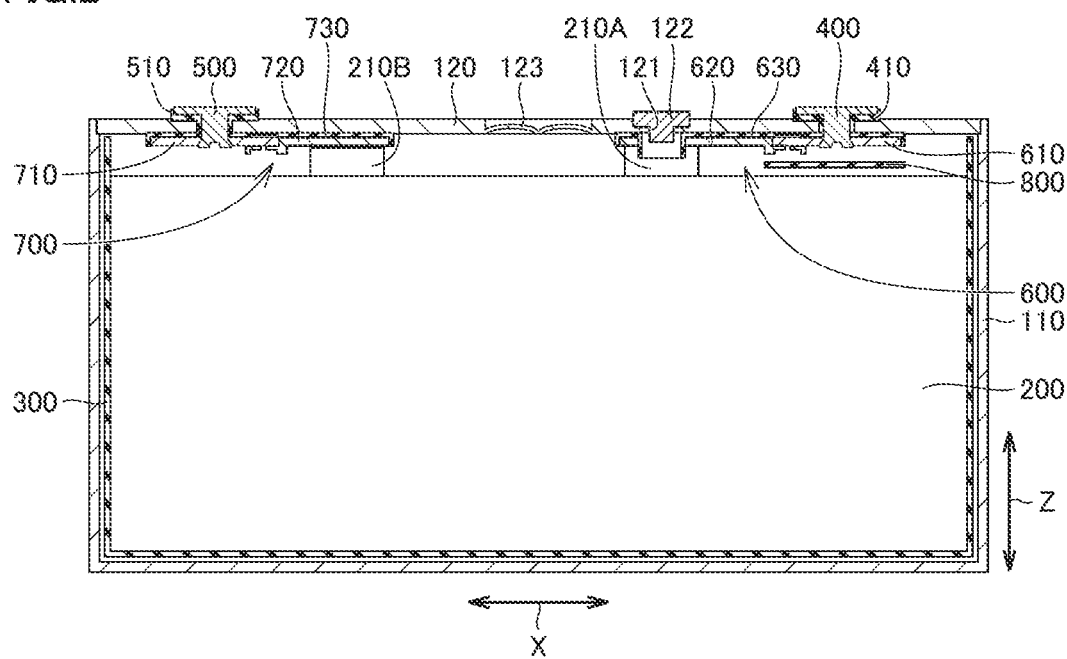
FIG. 2 is a cross sectional view taken along II-II in FIG. 1.

FIG. 1 is a perspective view of a prismatic secondary battery 1. FIG. 2 is a cross sectional view taken along II-II in FIG. 1.

As shown in FIGS. 1 and 2, prismatic secondary battery 1 includes a battery case 100, an electrode assembly 200, an insulating sheet 300, a positive electrode terminal 400, a negative electrode terminal 500, a positive electrode current collecting member 600, a negative electrode current collecting member 700, and a cover member 800.

Battery case 100 is constituted of: a prismatic exterior body 110 that is provided with an opening and that has a prismatic tubular shape having a bottom; and a sealing plate 120 that seals the opening of prismatic exterior body 110. Each of prismatic exterior body 110 and sealing plate 120 is preferably composed of a metal, and is preferably composed of aluminum or an aluminum alloy.

Sealing plate 120 is provided with an electrolyte solution injection hole 121. After injecting an electrolyte solution into battery case 100 via electrolyte solution injection hole 121, electrolyte solution injection hole 121 is sealed by a sealing member 122. As sealing member 122, for example, a blind rivet or another metal member can be used.

Sealing plate 120 is provided with a gas discharge valve 123. Gas discharge valve 123 is fractured when pressure in battery case 100 becomes more than or equal to a predetermined value. Thus, gas in battery case 100 is discharged to outside of battery case 100.

Electrode assembly 200 is accommodated in battery case 100 together with the electrolyte solution. Electrode assembly 200 is formed by stacking positive electrode plates and negative electrode plates with separators being interposed therebetween. Insulating sheet 300, which is composed of a resin, is disposed between electrode assembly 200 and prismatic exterior body 110.

A positive electrode tab 210A and a negative electrode tab 210B are provided at an end portion of electrode assembly 200 on the sealing plate 120 side.

Positive electrode tab 210A and positive electrode terminal 400 are electrically connected to each other via positive electrode current collecting member 600. Positive electrode current collecting member 600 includes a first positive electrode current collector 610 and a second positive electrode current collector 620. It should be noted that positive electrode current collecting member 600 may be constituted of one component. Positive electrode current collecting member 600 is preferably composed of a metal, and is more preferably composed of aluminum or an aluminum alloy.

Negative electrode tab 210B and negative electrode terminal 500 are electrically connected to each other via negative electrode current collecting member 700. Negative electrode current collecting member 700 includes a first negative electrode current collector 710 and a second negative electrode current collector 720. It should be noted that negative electrode current collecting member 700 may be constituted of one component. Negative electrode current collecting member 700 is preferably composed of a metal, and is more preferably composed of copper or a copper alloy.

Positive electrode terminal 400 is fixed to sealing plate 120 with an outer side insulating member 410 being interposed therebetween, outer side insulating member 410 being composed of a resin. Negative electrode terminal 500 is fixed to sealing plate 120 with an outer side insulating member 510 being interposed therebetween, outer side insulating member 510 being composed of a resin.

Positive electrode terminal 400 is preferably composed of a metal, and is more preferably composed of aluminum or an aluminum alloy. Negative electrode terminal 500 is preferably composed of a metal, and is more preferably composed of copper or a copper alloy. Negative electrode terminal 500 may have: a region that is composed of copper or a copper alloy and that is disposed on the inner side of battery case 100; and a region that is composed of aluminum or an aluminum alloy and that is disposed on the outer side of battery case 100.

Cover member 800 is located between first positive electrode current collector 610 and electrode assembly 200. Cover member 800 may be provided on the negative electrode current collector side. Further, cover member 800 is not an essential member, and may be omitted as appropriate.
(Configuration of Electrode Assembly 200)

Figure 3:
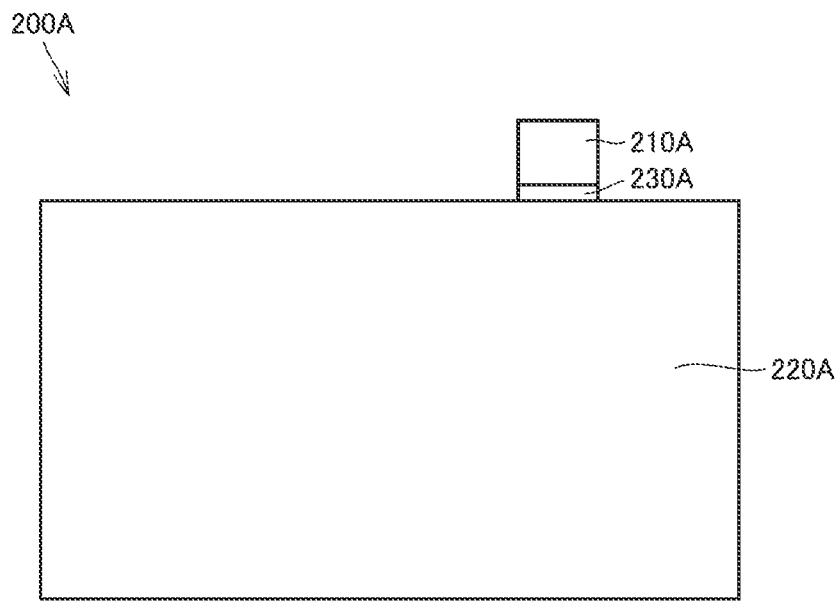
FIG. 3 is a plan view of a positive electrode plate included in an electrode assembly.

FIG. 3 is a plan view of positive electrode plate 200A included in electrode assembly 200. Positive electrode plate 200A has a main body 220A in which a positive electrode active material composite layer is formed on each of both surfaces of a positive electrode core body constituted of an aluminum foil having a quadrangular shape, the positive electrode active material composite layer including a positive electrode active material (for example, lithium nickel cobalt manganese composite oxide or the like), a binder (polyvinylidene difluoride (PVdF) or the like), and a conductive material (for example, a carbon material or the like). The positive electrode core body protrudes from an end side of the main body portion, and the positive electrode core body thus protruding constitutes positive electrode tab 210A. A positive electrode protection layer 230A including alumina particles, a binder, and a conductive material is provided on positive electrode tab 210A at a portion adjacent to main body 220A. Positive electrode protection layer 230A has an electric resistance larger than that of the positive electrode active material composite layer. The positive electrode active material composite layer may include no conductive material. Positive electrode protection layer 230A may not be necessarily provided.

Figure 4:
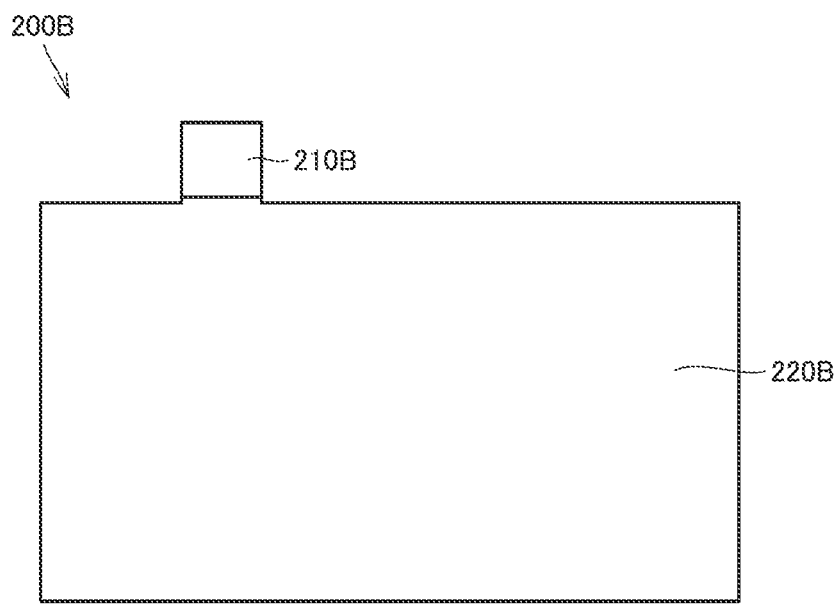
FIG. 4 is a plan view of a negative electrode plate included in the electrode assembly.

FIG. 4 is a plan view of negative electrode plate 200B included in electrode assembly 200. Negative electrode plate 200B has a main body 220B in which a negative electrode active material layer is formed on each of both surfaces of a negative electrode core body constituted of a copper foil having a quadrangular shape. The negative electrode core body protrudes from an end side of main body 220B, and the negative electrode core body thus protruding constitutes negative electrode tab 210B.

Figure 5:
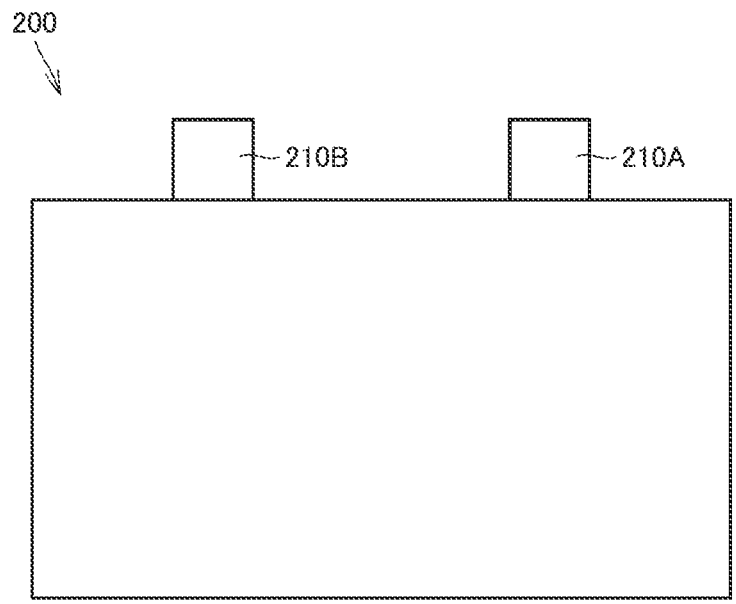
FIG. 5 is a plan view showing the electrode assembly including the positive electrode plate and the negative electrode plate.

FIG. 5 is a plan view showing electrode assembly 200 including positive electrode plates 200A and negative electrode plates 200B. As shown in FIG. 5, electrode assembly 200 is produced such that positive electrode tabs 210A of positive electrode plates 200A are stacked and negative electrode tabs 210B of negative electrode plates 200B are stacked at one end portion of electrode assembly 200. For example, about 50 positive electrode plates 200A and about 50 negative electrode plates 200B are stacked. Positive electrode plates 200A and negative electrode plates 200B are alternately stacked with separators being interposed therebetween, each of the separators being composed of polyolefin, each of the separators having a quadrangular shape. It should be noted that a long separator may be used with the separator being folded in a meandering manner.
(Structure of Connection Between Electrode Assembly 200 and Each of Positive Electrode Current Collecting Member 600 and Negative Electrode Current Collecting Member 700)

Figure 6:
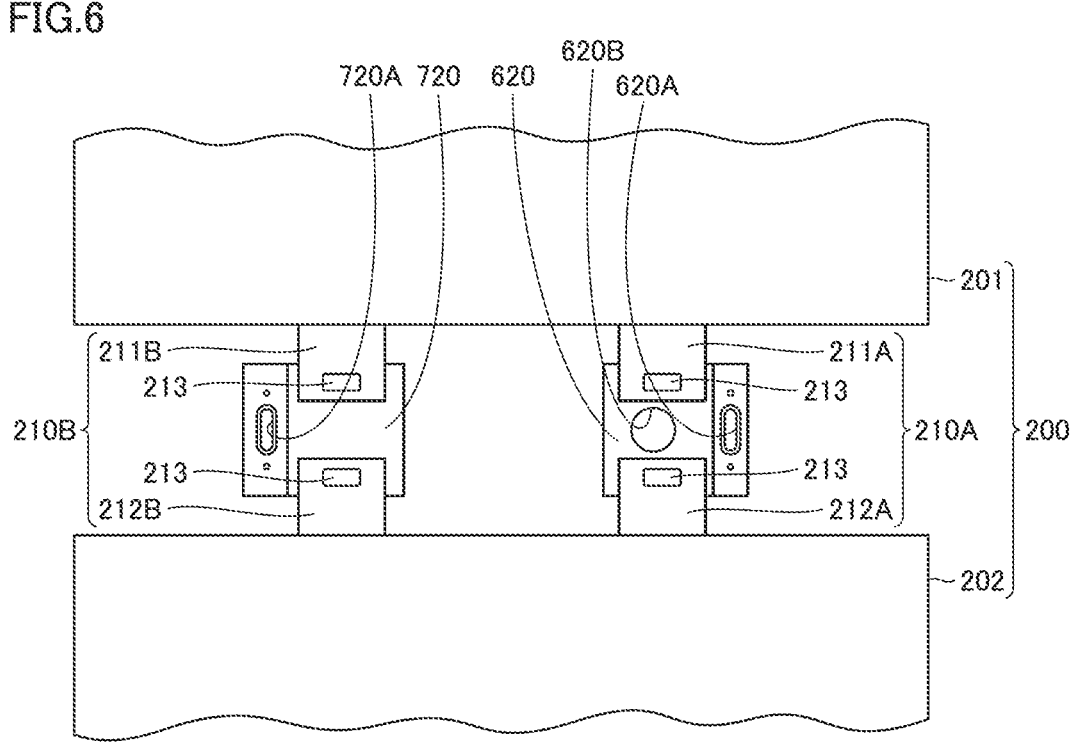
FIG. 6 is a diagram showing a structure of connection between the electrode assembly and each of a positive electrode current collecting member and a negative electrode current collecting member.

FIG. 6 is a diagram showing a structure of connection between electrode assembly 200 and each of positive electrode current collecting member 600 and negative electrode current collecting member 700. As shown in FIG. 6, electrode assembly 200 includes a first electrode assembly element 201 (first stack group) and a second electrode assembly element 202 (second stack group). Separators are also disposed on the respective outer surfaces of first electrode assembly element 201 and second electrode assembly element 202. First electrode assembly element 201 and second electrode assembly element 202 can be fixed in a stacked state by a tape or the like, for example. Alternatively, an adhesive layer may be provided on each of positive electrode plates 200A, negative electrode plates 200B, and the separators to adhere the separators and positive electrode plates 200A and to adhere the separators and negative electrode plates 200B.

The plurality of positive electrode tabs 210A of first electrode assembly element 201 constitute a first positive electrode tab group 211A. The plurality of negative electrode tabs 210B of first electrode assembly element 201 constitute a first negative electrode tab group 211B. The plurality of positive electrode tabs 210A of second electrode assembly element 202 constitute a second positive electrode tab group 212A. The plurality of negative electrode tabs 210B of second electrode assembly element 202 constitute a second negative electrode tab group 212B.

Second positive electrode current collector 620 and second negative electrode current collector 720 are disposed between first electrode assembly element 201 and second electrode assembly element 202. Second positive electrode current collector 620 is provided with a first opening 620A and a second opening 620B. First positive electrode tab group 211A and second positive electrode tab group 212A are connected onto second positive electrode current collector 620 by welding, thereby forming welded connection portions 213. First negative electrode tab group 211B and second negative electrode tab group 212B are connected onto second negative electrode current collector 720 by welding, thereby forming welded connection portions 213. Welded connection portions 213 can be formed by, for example, ultrasonic welding, resistance welding, laser welding, or the like.

(Structure of Attaching of Positive Electrode Current Collecting Member 600 and Negative Electrode Current Collecting Member 700 on Sealing Plate 120)

Figure 7:
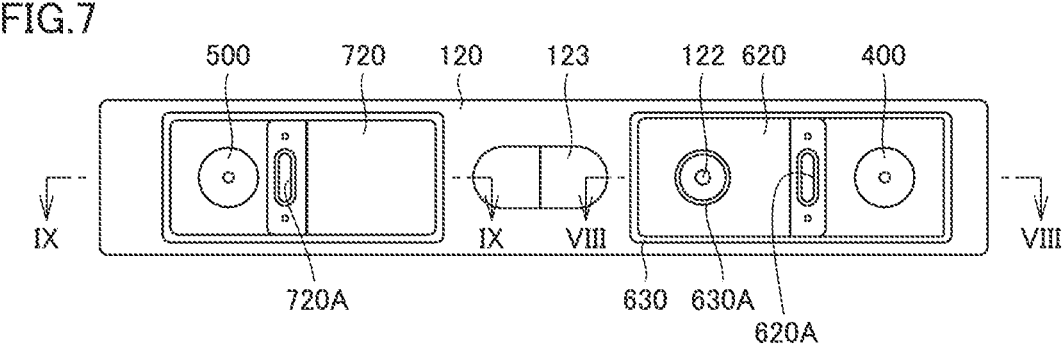
FIG. 7 is a diagram showing a structure of attaching of the positive electrode current collecting member and the negative electrode current collecting member on a sealing plate.
Figure 8:
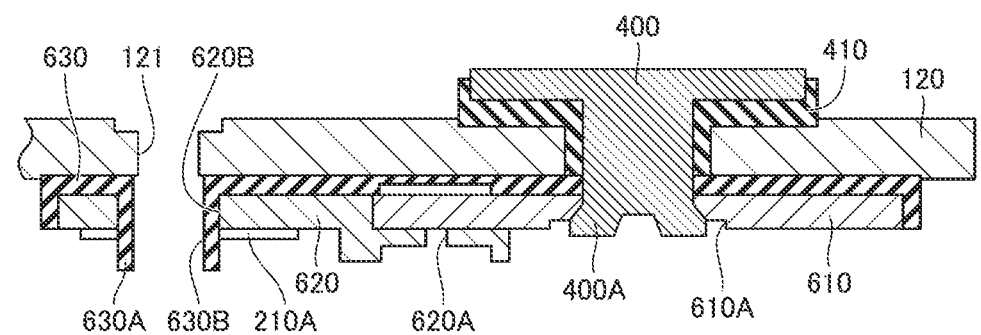
FIG. 8 is a cross sectional view taken along VIII-VIII in FIG. 7.
Figure 9:
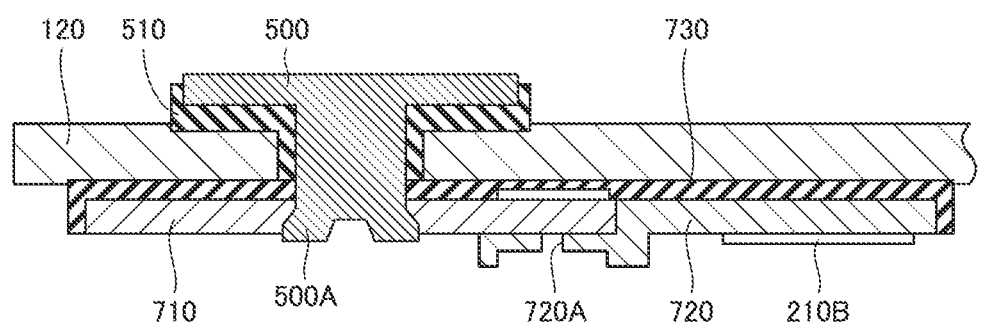
FIG. 9 is a cross sectional view taken along IX-IX in FIG. 7.

FIG. 7 is a diagram showing a structure of attaching of positive electrode current collecting member 600 and negative electrode current collecting member 700 on sealing plate 120. FIG. 8 shows a cross section taken along VIII-VIII in FIG. 7. FIG. 9 shows a cross section taken along IX-IX in FIG. 7.

First, the following describes attaching of positive electrode current collecting member 600 on sealing plate 120 with reference to FIGS. 7 and 8.

Outer side insulating member 410 composed of a resin is disposed on the outer surface side of sealing plate 120. First positive electrode current collector 610 and insulating member 630 (positive electrode current collector holder) composed of a resin are disposed on the inner surface side of sealing plate 120. Next, positive electrode terminal 400 is inserted into a through hole of outer side insulating member 410, a positive electrode terminal attachment hole of sealing plate 120, a through hole of first positive electrode current collector 610, and a through hole of insulating member 630. A swaged portion 400A located at the tip of positive electrode terminal 400 is connected onto first positive electrode current collector 610 by swaging. Thus, positive electrode terminal 400, outer side insulating member 410, sealing plate 120, first positive electrode current collector 610, and insulating member 630 are fixed. It should be noted that the portions of positive electrode terminal 400 and first positive electrode current collector 610 connected to each other by the swaging are preferably welded by laser welding or the like. It should be noted that first positive electrode current collector 610 is provided with a countersunk hole 610A, and swaged portion 400A is provided in countersunk hole 610A.

Further, second positive electrode current collector 620 is disposed on insulating member 630 such that a portion of second positive electrode current collector 620 overlaps with first positive electrode current collector 610. In first opening 620A provided in second positive electrode current collector 620, second positive electrode current collector 620 is welded to first positive electrode current collector 610 by laser welding or the like.

As shown in FIG. 8, insulating member 630 has a tubular portion 630A that protrudes on the electrode assembly 200 side. Tubular portion 630A extends through second opening 620B of second positive electrode current collector 620 and defines a hole portion 630B that communicates with electrolyte solution injection hole 121.

When attaching positive electrode current collecting member 600 on sealing plate 120, first positive electrode current collector 610 is first connected to insulating member 630 on sealing plate 120. Then, second positive electrode current collector 620 connected to electrode assembly 200 is attached to first positive electrode current collector 610. On this occasion, second positive electrode current collector 620 is disposed on insulating member 630 such that a portion of second positive electrode current collector 620 overlaps with first positive electrode current collector 610. Then, the circumference around first opening 620A provided in second positive electrode current collector 620 is welded to first positive electrode current collector 610 by laser welding or the like.

Next, the following describes attaching of negative electrode current collecting member 700 on sealing plate 120 with reference to FIGS. 7 and 9.

Outer side insulating member 510 composed of a resin is disposed on the outer surface side of sealing plate 120. First negative electrode current collector 710 and insulating member 730 (negative electrode current collector holder) composed of a resin are disposed on the inner surface side of sealing plate 120. Next, negative electrode terminal 500 is inserted into a through hole of outer side insulating member 510, a negative electrode terminal attachment hole of sealing plate 120, a through hole of first negative electrode current collector 710, and a through hole of insulating member 730. A swaged portion 500A located at the tip of negative electrode terminal 500 is connected onto first negative electrode current collector 710 by swaging. Thus, negative electrode terminal 500, outer side insulating member 510, sealing plate 120, first negative electrode current collector 710, and insulating member 730 are fixed. It should be noted that the portions of negative electrode terminal 500 and first negative electrode current collector 710 connected to each other by the swaging are preferably welded by laser welding or the like.

Further, second negative electrode current collector 720 is disposed on insulating member 730 such that a portion of second negative electrode current collector 720 overlaps with first negative electrode current collector 710. In first opening 720A provided in second negative electrode current collector 720, second negative electrode current collector 720 is welded to first negative electrode current collector 710 by laser welding or the like.

When attaching negative electrode current collecting member 700 on sealing plate 120, first negative electrode current collector 710 is first connected to insulating member 730 on sealing plate 120. Then, second negative electrode current collector 720 connected to electrode assembly 200 is attached to first negative electrode current collector 710. On this occasion, second negative electrode current collector 720 is disposed on insulating member 730 such that a portion of second negative electrode current collector 720 overlaps with first negative electrode current collector 710. Then, the circumference around first opening 720A provided in second negative electrode current collector 720 is welded to first negative electrode current collector 710 by laser welding or the like.

(Structure of Connection Between Sealing Plate 120 and Electrode Assembly 200)

Figure 10:
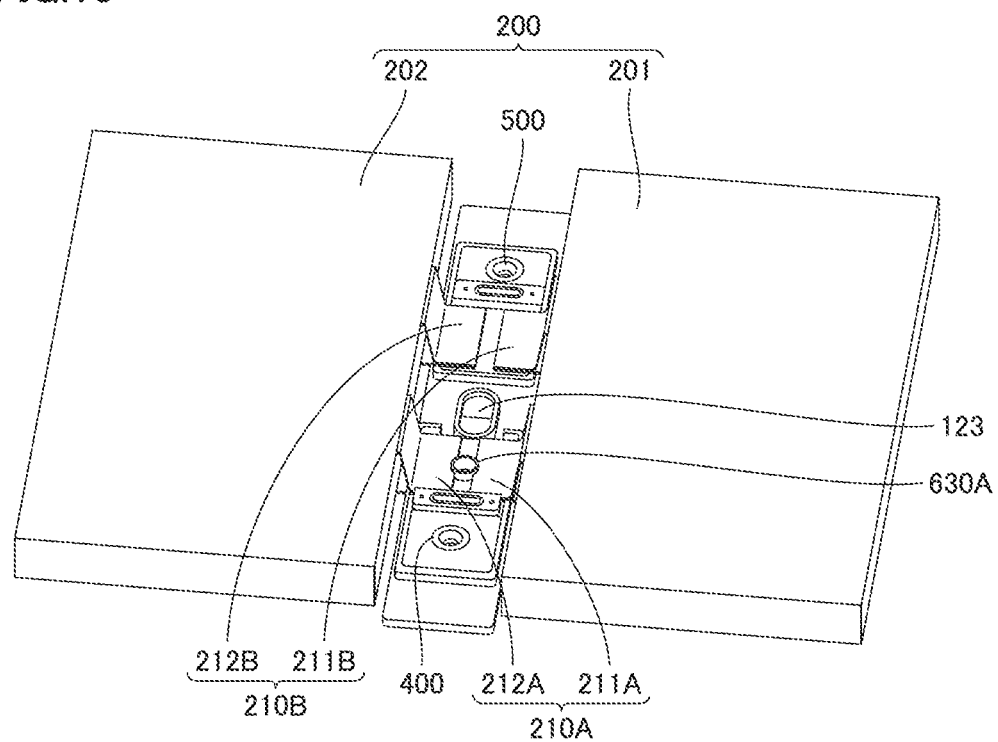
FIG. 10 is a diagram showing a state in which the sealing plate and the electrode assembly are connected to each other.

FIG. 10 is a diagram showing a state in which sealing plate 120 and electrode assembly 200 are connected to each other. As described above, first electrode assembly element 201 and second electrode assembly element 202 are attached to sealing plate 120 with positive electrode current collecting member 600 and negative electrode current collecting member 700 being interposed therebetween. Thus, as shown in FIG. 10, first electrode assembly element 201 and second electrode assembly element 202 are connected to sealing plate 120, thereby electrically connecting electrode assembly 200 to positive electrode terminal 400 and negative electrode terminal 500.

(Formation of Electrode Assembly 200 and Prismatic Secondary Battery 1)

From the state shown in FIG. 10, first electrode assembly element 201 and second electrode assembly element 202 are stacked on each other. On this occasion, first positive electrode tab group 211A and second positive electrode tab group 212A are curved in different directions. First negative electrode tab group 211B and second negative electrode tab group 212B are curved in different directions.

First electrode assembly element 201 and second electrode assembly element 202 can be stacked on each other by a tape or the like. Alternatively, first electrode assembly element 201 and second electrode assembly element 202 can be stacked on each other by placing them in an insulating sheet formed in the form of a box or a pouch. Further, first electrode assembly element 201 and second electrode assembly element 202 can be fixed by adhesion.

First electrode assembly element 201 and second electrode assembly element 202 stacked on each other are enclosed with insulating sheet 300 and are inserted into prismatic exterior body 110. Thereafter, sealing plate 120 is welded to prismatic exterior body 110 to seal the opening of prismatic exterior body 110 by sealing plate 120, thereby forming sealed battery case 100.

Thereafter, a non-aqueous electrolyte is injected into battery case 100 through electrolyte solution injection hole 121 provided in sealing plate 120. Examples of the non-aqueous electrolyte solution usable herein include a non-aqueous electrolyte solution in which $LiPF_6$ is dissolved at a concentration of 1.2 mol/L in a non-aqueous solvent in which ethylene carbonate (EC), ethyl methyl carbonate (EMC), and diethyl carbonate (DEC) are mixed at a volume ratio (25° C.) of 30:30:40.

After injecting the non-aqueous electrolyte, electrolyte solution injection hole 121 is sealed by sealing member 122. By performing the above steps, prismatic secondary battery 1 is completed.

(Arrangement of Bus Bars 2 in Battery Pack)

Figure 11:
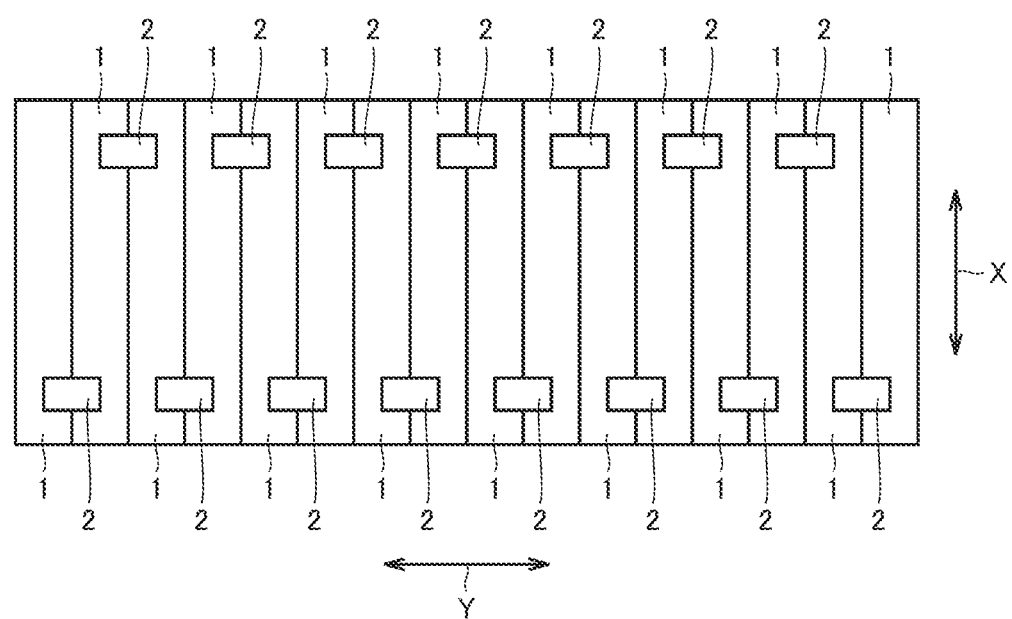
FIG. 11 is a diagram showing an arrangement of bus bars in a battery pack.

FIG. 11 is a diagram showing an arrangement of bus bars in a battery pack. In the example shown in FIG. 11, a plurality of prismatic secondary batteries 1 are connected in series. That is, in the example of FIG. 11, positive electrode terminals 400 and negative electrode terminals 500 of adjacent prismatic secondary batteries 1 are electrically connected by bus bars 2. Positive electrode terminals 400 and negative electrode terminals 500 are typically joined to bus bars 2 by welding.

(Joining of Electrode Terminal to Current Collecting Member by Swaging)

Figure 12:
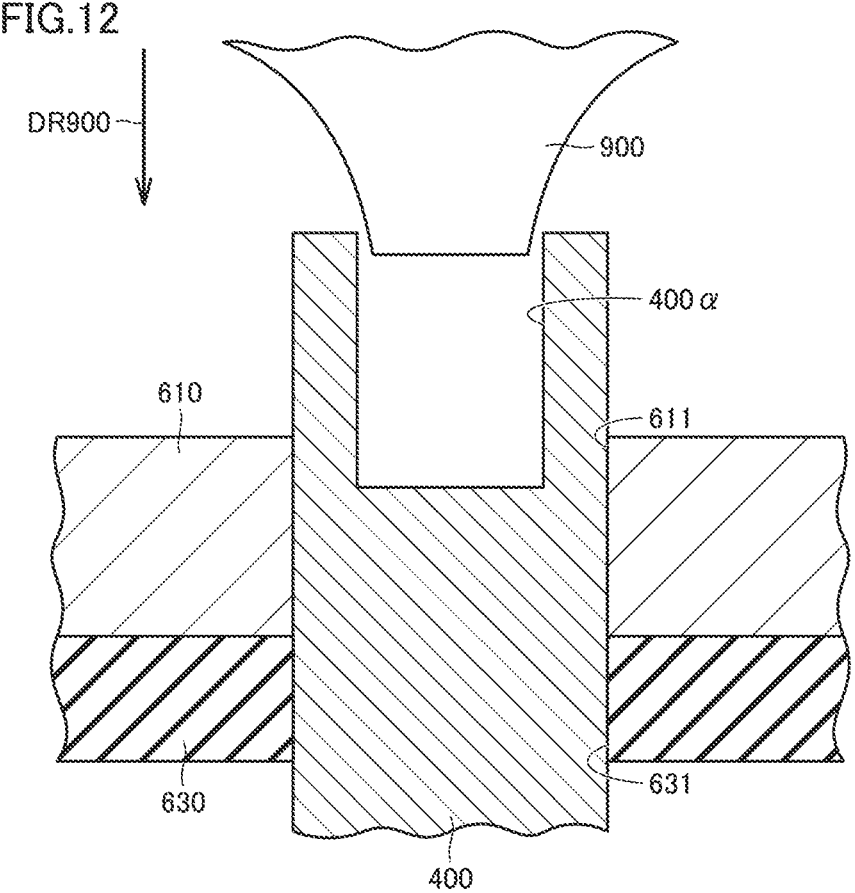
FIG. 12 is a diagram showing an electrode terminal and a current collector before joining by swaging.
Figure 13:
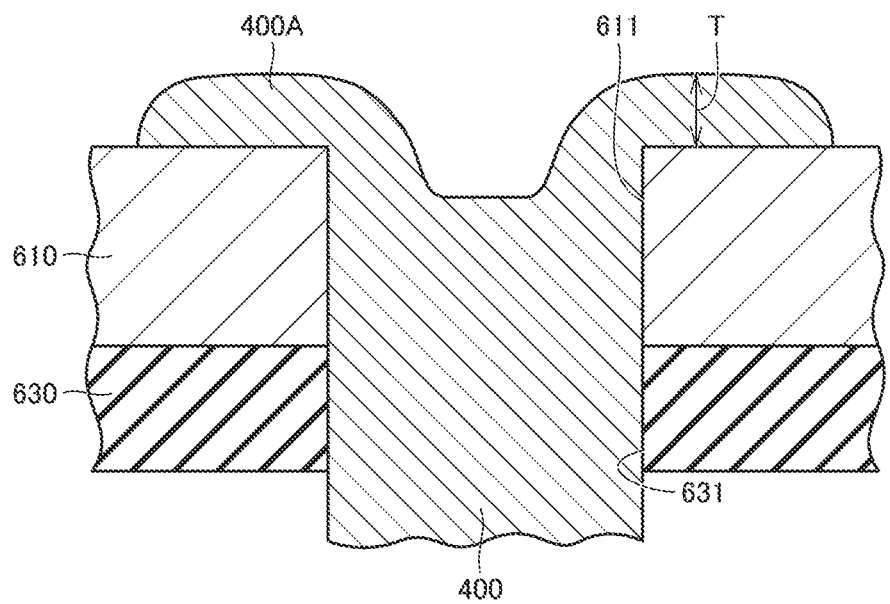
FIG. 13 is a diagram showing the electrode terminal and the current collector after the joining by swaging.

FIG. 12 is a diagram showing positive electrode terminal 400 (terminal member) and first positive electrode current collector 610 (current collector) before joining by swaging, and FIG. 13 is a diagram showing positive electrode terminal 400 (terminal member) and first positive electrode current collector 610 (current collector) after the joining by swaging. It should be noted that swaged portion 400A of positive electrode terminal 400 to first positive electrode current collector 610 will be illustrated in the description below; however, the same structure can be employed for swaged portion 500A.

As shown in FIG. 12, in a state in which positive electrode terminal 400 is inserted in through holes 611, 631 formed in first positive electrode current collector 610 and insulating member 630 and a tip hole portion 400α of positive electrode terminal 400 is exposed on the first positive electrode current collector 610 side, a jig 900 is disposed over tip hole portion 400α of positive electrode terminal 400, and jig 900 is moved in a direction of arrow DR900. Thus, as shown in FIG. 13, first positive electrode current collector 610 and positive electrode terminal 400 are joined to each other, thereby forming swaged portion 400A (joined portion) having a thickness T.

(Shape of Swaged Portion)

Figure 14:
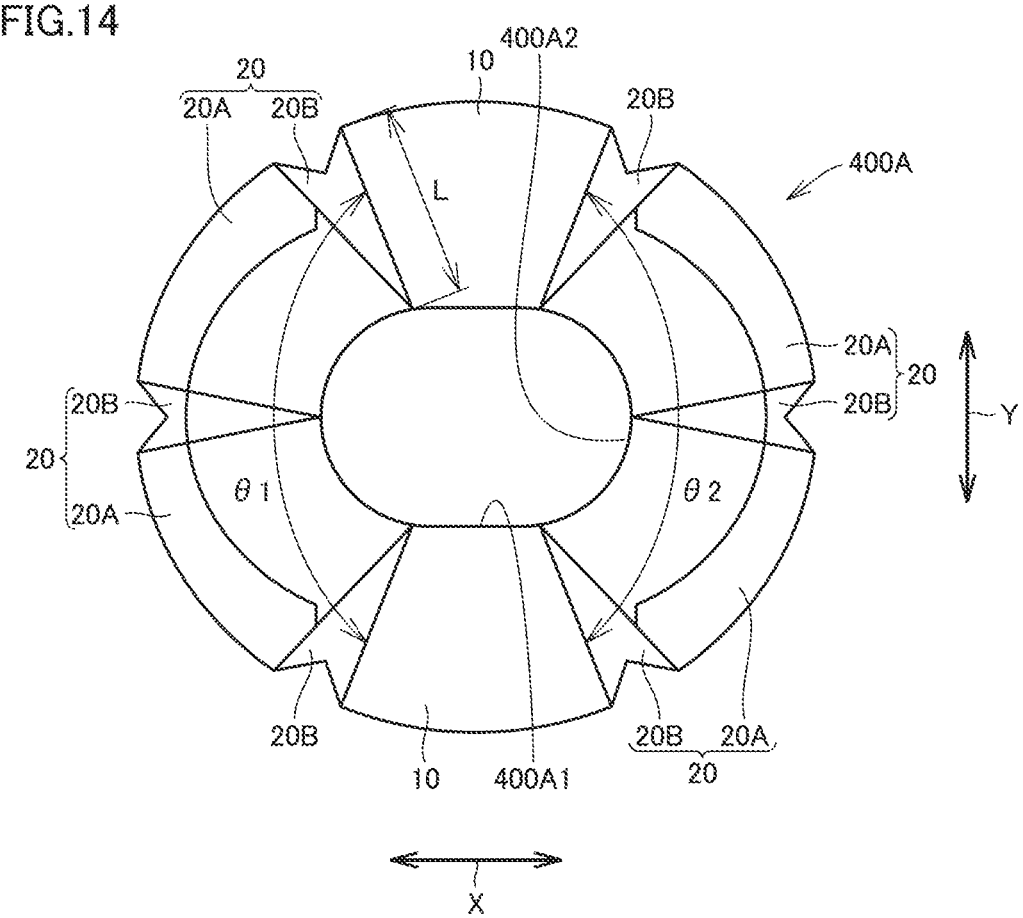
FIG. 14 is a diagram showing a first exemplary shape of a swaged portion.

FIG. 14 shows an exemplary shape of swaged portion 400A. It should be noted that the same shape as that of swaged portion 400A can be employed for swaged portion 500A. Prismatic secondary battery 1 according to the present embodiment has one feature in the shape of swaged portion 400A (the same applies to swaged portion 500A).

As shown in FIG. 14, swaged portion 400A includes: thick portions 10 at each of which the thickness of positive electrode terminal 400 is relatively thick; and thin portions 20 at each of which the thickness of positive electrode terminal 400 is relatively thin. Thickness T of thick portion 10 is, for example, about more than or equal to 0.45 mm and less than or equal to 0.9 mm. In the present embodiment, thin portion 20 refers to a portion having a thickness T thinner than that of thick portion 10 by about 10% or more.

Swaged portion 400A is composed of a metal such as aluminum or copper. A nickel layer may be formed on a surface of swaged portion 400A.

Swaged portion 400A is formed to have a thickness T that is gradually decreased at a boundary between thick portion 10 and thin portion 20. However, there may be formed a level difference to change the thickness at the boundary between thick portion 10 and thin portion 20.

Two thick portions 10 are formed to be separated from each other in an upward/downward direction in FIG. 14. That is, the plurality of thick portions 10 are formed to be separated from each other in the Y axis direction (the short side direction of sealing plate 120) orthogonal to the X axis direction (the long side direction of sealing plate 120) in which positive electrode terminal 400 and negative electrode terminal 500 are arranged side by side. Each of thick portions 10 is located on the central axis of swaged portion 400A, the central axis extending in the Y axis direction. Typically, thick portion 10 has a portion at which thickness T is maximum in swaged portion 400A; however, a portion having a thicker thickness T than that of thick portion 10 may exist in swaged portion 400A.

Each of thin portions 20 includes a first thin portion 20A and a second thin portion 20B. First thin portion 20A extends in a circumferential direction along the outer circumferential edge of swaged portion 400A. First thin portion 20A may be joined to first positive electrode current collector 610 by welding. Since the thickness of first thin portion 20A is relatively thin, positional deviation of a welding application position is less likely to occur, thereby obtaining stable welding strength.

Second thin portion 20B is formed at a position adjacent to thick portion 10 in the circumferential direction of swaged portion 400A. Second thin portion 20B extends in the radial direction of swaged portion 400A. Second thin portion 20B is formed to extend radially. Thick portions 10 and second thin portions 20B may be alternately disposed in the circumferential direction of swaged portion 400A.

At a portion at which each second thin portion 20B is located, the outer circumferential edge of swaged portion 400A is formed to be recessed toward the center of swaged portion 400A. That is, the width of swaged portion 400A at second thin portion 20B is smaller than width L of swaged portion 400A at thick portion 10.

Swaged portion 400A includes a pair of straight portions 400A1 and a pair of curved portions 400A2 alternately along the circumferential direction. Four second thin portions 20B of six second thin portions 20B shown in FIG. 14 are located between straight portions 400A1 and curved portions 400A2.

The planar shape of swaged portion 400A is not limited to the one having straight portions 400A1 and curved portions 400A2. For example, the planar shape of swaged portion 400A may be a perfect circular shape or an elliptical shape.

Each of first thin portions 20A is formed by forming swaged portion 400A of positive electrode terminal 400 to first positive electrode current collector 610 and then pressing swaged portion 400A.

Each of second thin portions 20B is formed at the time of the swaging step of forming swaged portion 400A of positive electrode terminal 400 to first positive electrode current collector 610, i.e., is formed at the same time as the formation of swaged portion 400A. However, second thin portion 20B may be formed by forming swaged portion 400A and then pressing swaged portion 400A.

In the example of FIG. 14, first thin portions 20A and second thin portions 20B are formed in ranges of angles θ1, θ2(=130°) in the circumferential direction. That is, first thin portions 20A and second thin portions 20B are formed within a range of less than or equal to about ±65° with respect to the X axis direction. In this way, thick portions 10 can be selectively provided at both ends of prismatic secondary battery 1 in the short side direction (Y axis direction) of prismatic secondary battery 1, the both ends of prismatic secondary battery 1 requiring relatively large strength in swaged portion 400A. As a result, strength of joining of positive electrode terminal 400 to first positive electrode current collector 610 by swaged portion 400A can be improved without excessively increasing the size of swaged portion 400A. As a result, stable electric conduction between positive electrode terminal 400 and first positive electrode current collector 610 can be achieved.

Figure 15:
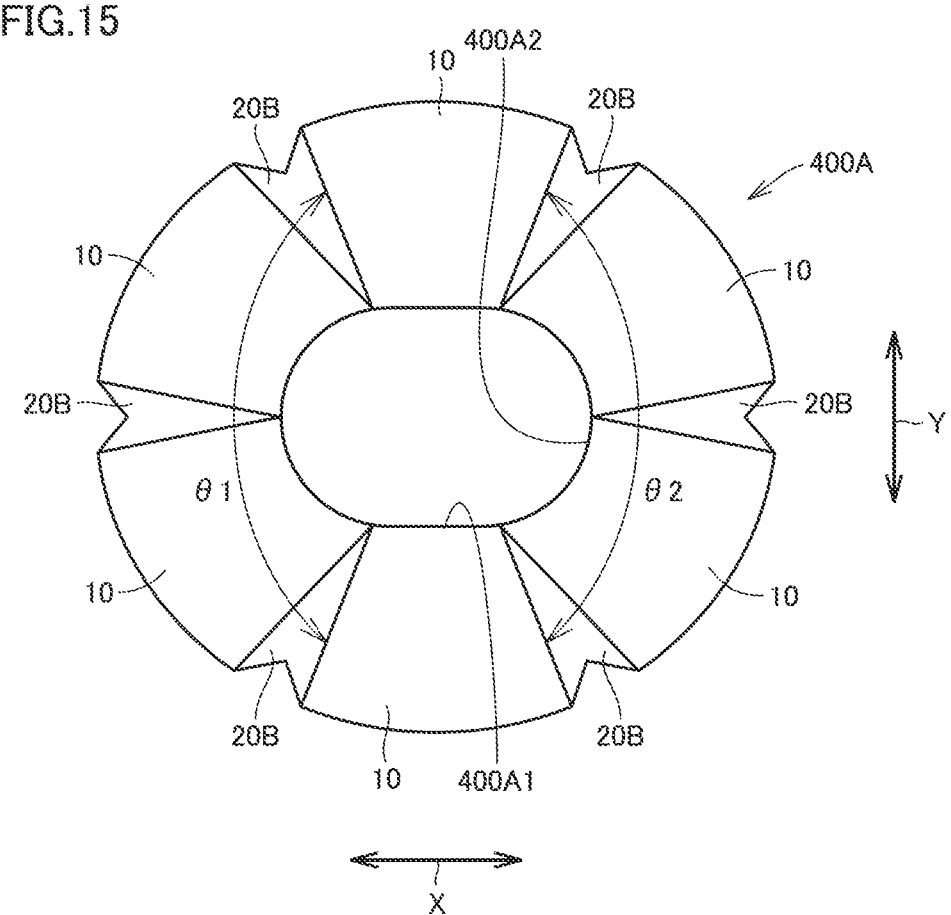
FIG. 15 is a diagram showing a second exemplary shape of the swaged portion.
Figure 16:
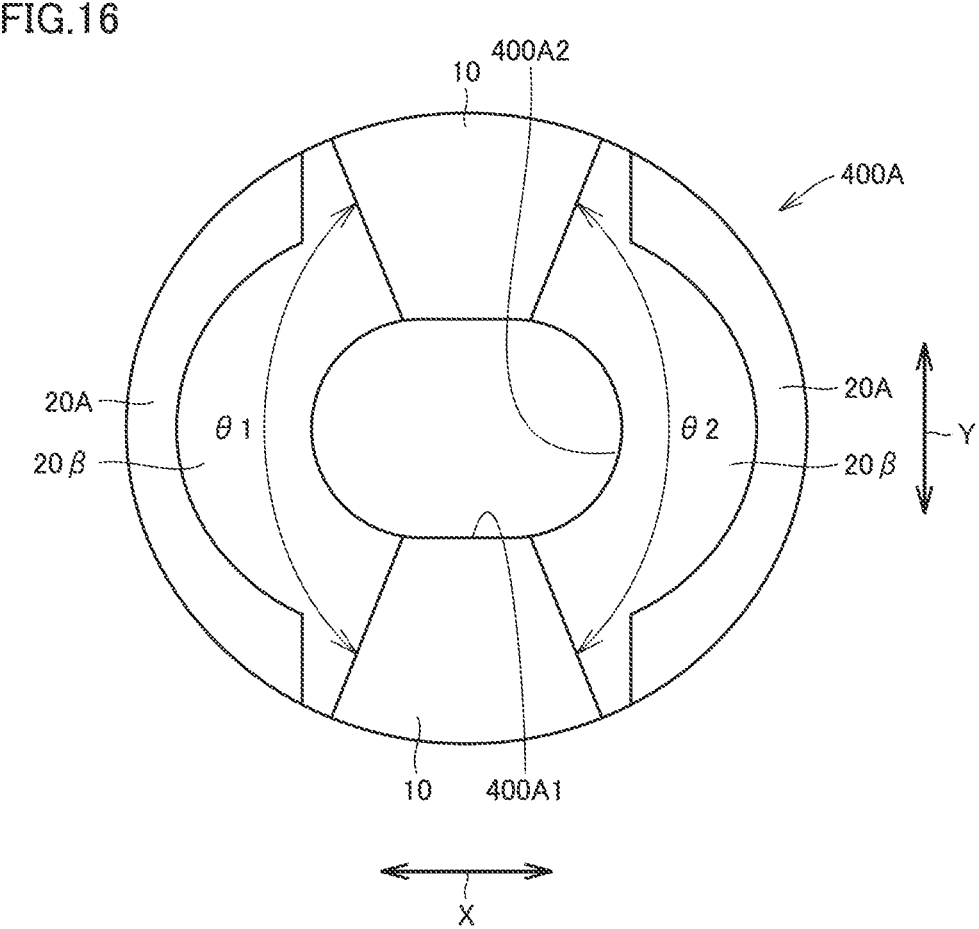
FIG. 16 is a diagram showing a third exemplary shape of the swaged portion.
Figure 17:
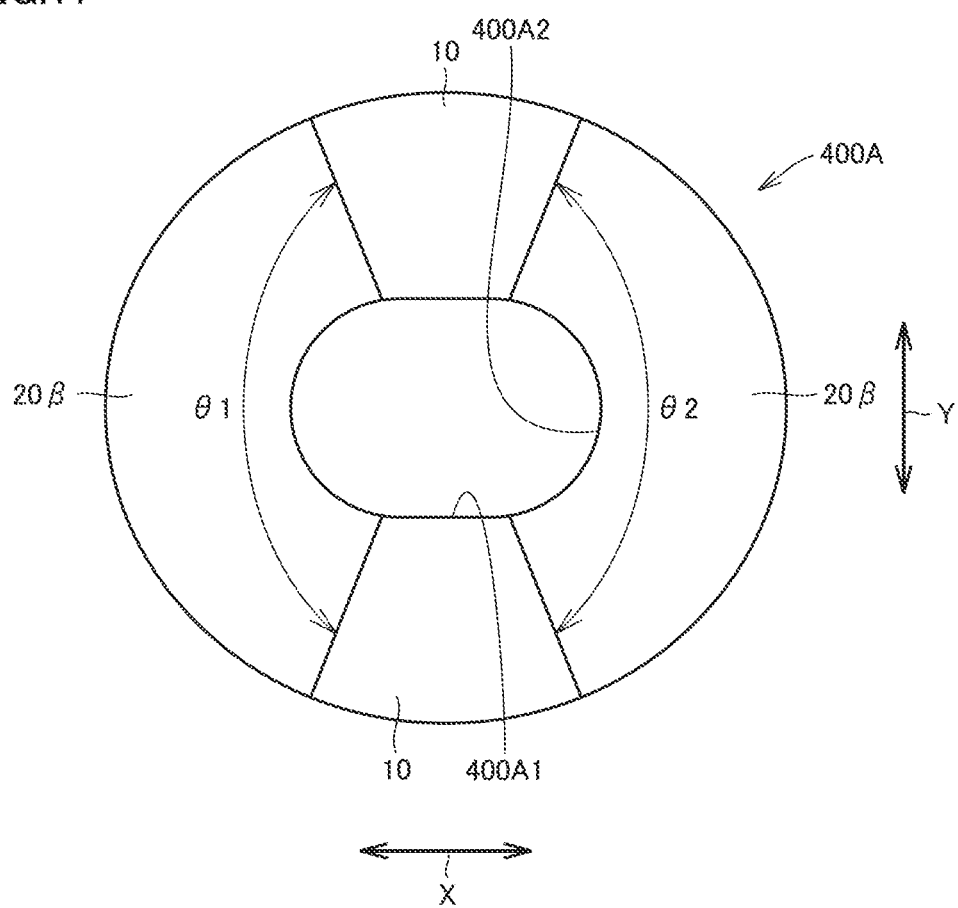
FIG. 17 is a diagram showing a fourth exemplary shape of the swaged portion.
Figure 18:
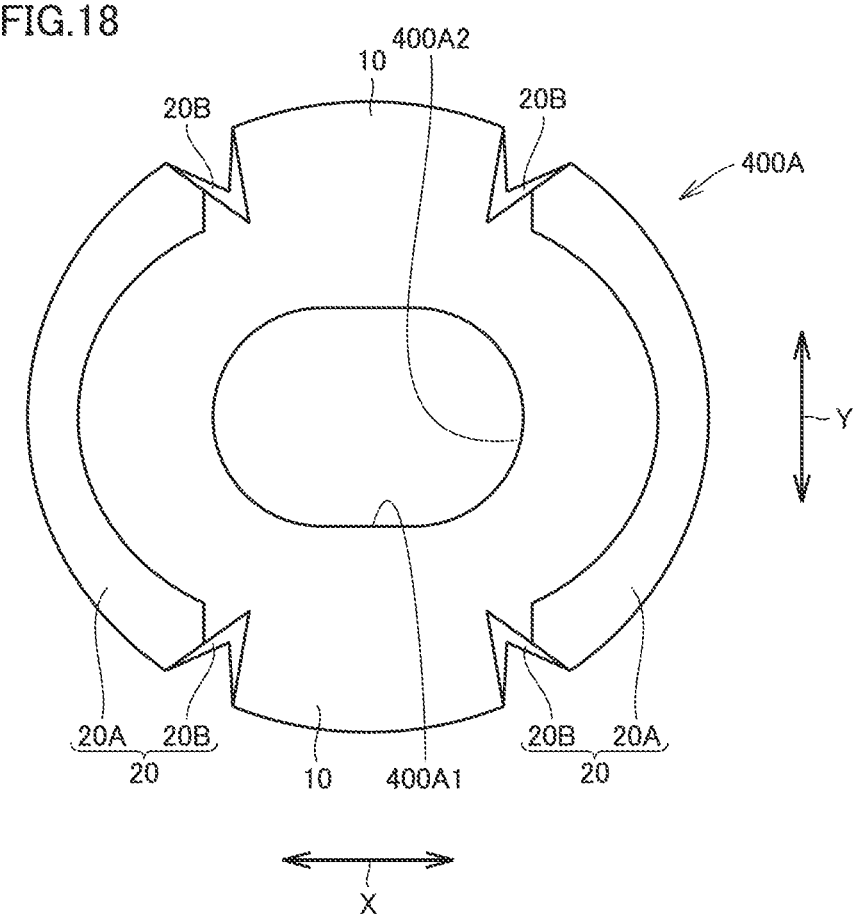
FIG. 18 is a diagram showing a fifth exemplary shape of the swaged portion.

FIGS. 15 to 18 show modifications of the shape of swaged portion 400A. As shown in FIG. 15, only radial second thin portions 20B and thick portions 10 may be provided without forming first thin portions 20A. Further, as shown in FIG. 16, first thin portions 20A and second thin portions 20B (not shown in FIG. 16 because the positions and shapes thereof are changed as appropriate) may be formed in thin portion formation regions 20β that are within a range of less than or equal to about ±65° with respect to the X axis direction. Further, as shown in FIG. 17, only second thin portions 20B (also not shown in FIG. 17 because the positions and shapes thereof are changed as appropriate) may be formed in thin portion formation regions 20β that are within a range of less than or equal to about ±65° with respect to the X axis direction. Further, as shown in FIG. 18, second thin portions 20B may be formed only in the vicinity of the outer circumferential edge portion of swaged portion 400A and may not reach the inner circumferential portion of swaged portion 400A.

(Application to Outside of Battery Case 100)

Figure 19:
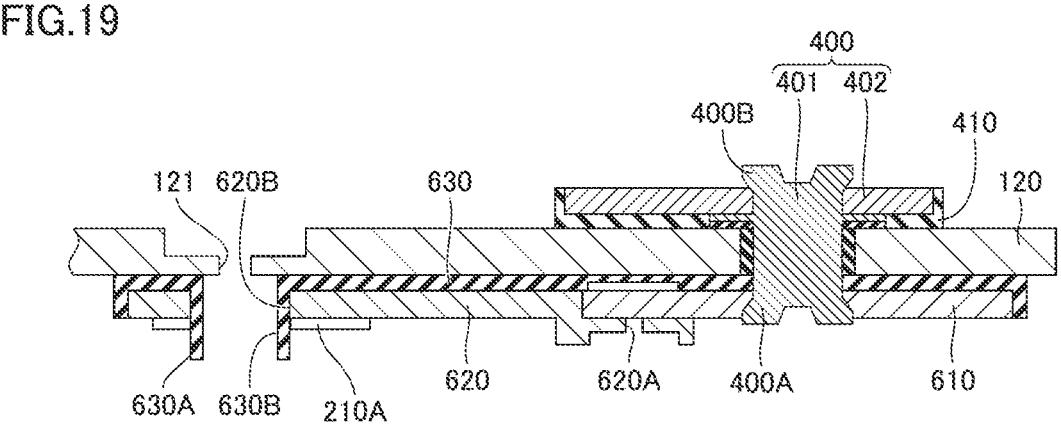
FIG. 19 is a diagram showing a structure of a swaged portion outside the battery case.

In the above-described example, swaged portion 400A inside battery case 100 has been described; however, as shown in FIG. 19, the same configuration can be employed for a swaged portion 400B of a terminal member 401 of positive electrode terminal 400 to an external terminal 402 (conductive member). That is, the structure of joining according to the present disclosure is also applicable to a structure of joining of a terminal member to a conductive member, which are disposed outside battery case 100.

Although the embodiments of the present invention have been described and illustrated in detail, it is clearly understood that the same is by way of illustration and example only and is not to be taken by way of limitation, the scope of the present invention being interpreted by the terms of the appended claims.

What is claimed is:

1. A battery comprising: a conductive member provided with a through hole; and a terminal member inserted in the through hole from a first side of the conductive member to a second, opposite side of the conductive member and having a tip portion exposed on the second, opposite side of the conductive member, wherein a joined portion of the tip portion of the terminal member to the conductive member is formed, and the joined portion includes a thick portion at which a thickness of the terminal member is relatively thick, and a thin portion at which the thickness of the terminal member is relatively thin, wherein the thin portion includes at least one recess formed into the tip portion on an opposite side of the tip portion from the conductive member, and the thin portion continuously changes in thickness and extends in a radial direction of the joined portion.

2. The battery according to claim 1, wherein
the battery has an upper surface having a quadrangular shape, the upper surface including a long side direction and a short side direction, and
a plurality of the thick portions are formed to be separated from each other in the short side direction.

3. The battery according to claim 1, wherein
the battery has an upper surface having a quadrangular shape, the upper surface including a long side direction and a short side direction, and
the thick portion has a portion having a maximum thickness on a central axis of the joined portion, the central axis extending in the short side direction.

4. The battery according to claim 1, wherein the thick portion and the thin portion are alternately disposed in a circumferential direction of the joined portion.

5. The battery according to claim 1, wherein the joined portion is formed to have a thickness that is gradually decreased in a direction from the thick portion toward the thin portion.

6. The battery according to claim 1, wherein an outer circumference of the joined portion is provided with a recess recessed toward a center of the joined portion at a portion at which the thin portion is located.

7. The battery according to claim 1, wherein the joined portion is formed by a swaged portion of the tip portion of the terminal member to the conductive member.

8. The battery according to claim 7, wherein
the swaged portion has a planar shape including a pair of straight portions and a pair of curved portions, and
the thin portion is located between each of the straight portions and each of the curved portions.

9. The battery according to claim 1, further comprising an electrode assembly, wherein the conductive member is a current collector that electrically connects the electrode assembly and the terminal member to each other.

10. A method of manufacturing a battery, the method comprising: inserting a terminal member into a through hole of a conductive member from a first side of the conductive member to a second, opposite side of the conductive member; forming a joined portion that has a central axis extending in a short side direction of an upper surface of the battery, the joined portion being a portion at which a tip portion of the terminal member is joined to the conductive member on the second, opposite side of the conductive member; and processing the joined portion to form a thick portion on the central axis, the thick portion being a portion at which a thickness of the joined portion is relatively thick, and to form a thin portion at which the thickness of the terminal member is relatively thin, wherein the thin portion includes at least one recess formed into the tip portion on an opposite side of the tip portion from the conductive member, and the thin portion continuously changes in thickness and extends in a radial direction of the joined portion.

11. The method of manufacturing the battery according to claim 10, wherein the processing of the joined portion is performed simultaneously with the joining of the tip portion of the terminal member to the conductive member by swaging.

12. The method of manufacturing the battery according to claim 10, wherein the processing of the joined portion is performed after the joining of the tip portion of the terminal member to the conductive member.

13. The method of manufacturing the battery according to claim 10, wherein the thin portion at which a thickness of the joined portion is relatively thin is formed at a position adjacent to the thick portion in a circumferential direction of the joined portion.

* * * * *